United States Patent
Feit (10) Patent No.: US 9,002,586 B2
(45) Date of Patent: Apr. 7, 2015

(54) INTEGRATED BIOMETRIC SWITCH

(71) Applicant: Steven Feit, Dublin, OH (US)

(72) Inventor: Steven Feit, Dublin, OH (US)

(73) Assignee: Honda Motor Co., Ltd., Minato-Ku, Tokyo (JP)

( * ) Notice: Subject to any disclaimer, the term of this patent is extended or adjusted under 35 U.S.C. 154(b) by 0 days.

(21) Appl. No.: 13/692,005

(22) Filed: Dec. 3, 2012

(65) Prior Publication Data

US 2014/0156149 A1 Jun. 5, 2014

(51) Int. Cl.
*G06K 9/00* (2006.01)
*B60R 25/25* (2013.01)
*F02N 11/08* (2006.01)
*G07C 9/00* (2006.01)

(52) U.S. Cl.
CPC .......... *G06K 9/00362* (2013.01); *B60R 25/252* (2013.01); *F02N 11/0803* (2013.01); *G07C 9/00563* (2013.01)

(58) Field of Classification Search
CPC ........... G07C 2009/00547; G07C 2009/00095; G07C 9/00087; G07C 9/00111; G07C 9/00563; G06F 21/35; G06F 21/34; G06F 21/32; G06K 9/0002; G06K 9/00362; B60R 25/25; B60R 25/252; B60R 25/04; B60R 25/045; F02N 11/0807; F02N 11/0803
USPC ...................... 701/49, 2, 36, 1; 180/283, 287; 382/124; 340/5.53
See application file for complete search history.

(56) References Cited

U.S. PATENT DOCUMENTS

| | | | |
|---|---|---|---|
| 5,867,802 A | 2/1999 | Borza | |
| 6,041,410 A * | 3/2000 | Hsu et al. | 713/186 |
| 6,100,811 A * | 8/2000 | Hsu et al. | 340/5.83 |
| 6,111,977 A * | 8/2000 | Scott et al. | 382/124 |
| 6,198,996 B1 * | 3/2001 | Berstis | 701/36 |
| 6,271,745 B1 * | 8/2001 | Anzai et al. | 340/5.53 |
| 6,292,576 B1 * | 9/2001 | Brownlee | 382/124 |
| 6,522,773 B1 * | 2/2003 | Houdeau | 382/124 |
| 6,633,090 B2 * | 10/2003 | Harter et al. | 307/10.6 |
| 6,727,800 B1 * | 4/2004 | Dutu | 340/5.53 |
| 6,810,309 B2 | 10/2004 | Sadler et al. | |
| 6,828,899 B2 | 12/2004 | Kim | |
| 6,862,443 B2 * | 3/2005 | Witte | 455/345 |
| 6,924,729 B1 * | 8/2005 | Aschauer et al. | 340/5.53 |
| 6,992,562 B2 * | 1/2006 | Fuks et al. | 340/5.52 |
| 6,998,956 B2 * | 2/2006 | Dix | 340/5.2 |
| 7,091,826 B2 * | 8/2006 | Hayakawa | 340/5.82 |

(Continued)

FOREIGN PATENT DOCUMENTS

DE 19811872 C1 * 8/1999
DE 19900032 A1 * 7/2000

(Continued)

*Primary Examiner* — Calvin Cheung
*Assistant Examiner* — Angelina Shudy
(74) *Attorney, Agent, or Firm* — Quarles & Brady LLP (57) ABSTRACT

A user interface is provided. The interface can be used to control an electronic system that is in communication with a vehicle. The interface includes a fingerprint reader, and a push-button switch mounted to the fingerprint reader. The switch is configured to detect a user pressing upon a surface of the fingerprint reader. The interface includes a controller. The controller is configured to detect the user pressing upon the surface of the fingerprint reader using the push-button switch, and, after detecting the user pressing upon the surface of the fingerprint reader, capture fingerprint data of the user using the fingerprint reader.

14 Claims, 5 Drawing Sheets

(56) References Cited

U.S. PATENT DOCUMENTS

| | | | |
|---|---|---|---|
| 7,116,803 B2* | 10/2006 | Lemelson et al. | 382/118 |
| 7,138,904 B1* | 11/2006 | Dutu | 340/5.72 |
| 7,228,213 B2* | 6/2007 | Sakai et al. | 701/49 |
| 7,424,618 B2* | 9/2008 | Roy et al. | 713/186 |
| 7,555,150 B2* | 6/2009 | Ikeda | 382/124 |
| 8,103,402 B2* | 1/2012 | Kozlay | 701/29.3 |
| 2002/0034321 A1* | 3/2002 | Saito et al. | 382/124 |
| 2003/0048000 A1* | 3/2003 | Harter et al. | 307/10.6 |
| 2003/0105568 A1* | 6/2003 | Melnyk et al. | 701/36 |
| 2003/0117261 A1* | 6/2003 | Gunsch | 340/5.25 |
| 2003/0169213 A1* | 9/2003 | Spero | 345/7 |
| 2004/0124968 A1* | 7/2004 | Inada et al. | 340/5.72 |
| 2004/0232013 A1* | 11/2004 | Renhed | 206/229 |
| 2004/0232229 A1* | 11/2004 | Gotfried et al. | 235/382 |
| 2004/0239509 A1* | 12/2004 | Kisacanin et al. | 340/575 |
| 2005/0237150 A1* | 10/2005 | Sun et al. | 340/5.52 |
| 2006/0202797 A1* | 9/2006 | Theis et al. | 340/5.52 |
| 2006/0212195 A1* | 9/2006 | Veith et al. | 701/35 |
| 2006/0294393 A1* | 12/2006 | Mc Call | 713/186 |
| 2007/0247279 A1* | 10/2007 | Safonov | 340/5.53 |
| 2008/0030301 A1* | 2/2008 | Terao | 340/5.53 |
| 2010/0097178 A1* | 4/2010 | Pisz et al. | 340/5.72 |
| 2010/0148923 A1* | 6/2010 | Takizawa | 340/5.82 |
| 2010/0246902 A1* | 9/2010 | Rowe et al. | 382/115 |
| 2011/0260830 A1* | 10/2011 | Weising | 340/5.52 |
| 2012/0268241 A1* | 10/2012 | Hanna et al. | 340/5.52 |
| 2012/0271484 A1* | 10/2012 | Feit et al. | 701/1 |
| 2013/0018551 A1* | 1/2013 | Fuchs et al. | 701/49 |
| 2013/0066667 A1* | 3/2013 | Gulec et al. | 705/7.13 |
| 2013/0096733 A1* | 4/2013 | Manotas, Jr. | 701/2 |
| 2014/0002237 A1* | 1/2014 | Infante et al. | 340/5.32 |
| 2014/0066110 A1* | 3/2014 | Lovegreen | 455/466 |

FOREIGN PATENT DOCUMENTS

| | | | |
|---|---|---|---|
| EP | 1849644 A1 | | 10/2007 |
| JP | 2000187420 A | * | 7/2000 |
| JP | 2002024812 A | * | 1/2002 |

* cited by examiner

INTEGRATED BIOMETRIC SWITCH

FIELD

The disclosure relates in general to an integrated biometric user interface and, more particularly, to a vehicle user interface incorporating a biometric sensor, such as a fingerprint reader, for identifying a user and controlling one or more system in communication with a vehicle.

BACKGROUND

Many vehicles include a number of systems or features that can be customized based upon a driver's preferences. Different drivers, for example, may prefer different seating or wheel positions, different radio or entertainment system configurations, and/or different mirror placement. Some vehicles include computer control systems that can store different preset configurations of these systems for different drivers. When a particular driver enters the vehicle, the vehicle can then setup those different systems in accordance with the driver's preferences.

In order to setup the vehicle in accordance with the driver's preferences, the driver must be identified. Many vehicles attempt to identify a driver by identifying a key fob being carried by the current driver. Because the key fobs are normally carried by a particular individual, this can sometimes provide an accurate identification of the individual. In many households, for example, each driver is assigned a particular key fob, and generally carries that key fob at all times. In that case, the identification of a particular key fob may allow the vehicle to identify a particular driver. Upon identifying the key fob, the vehicle then sets up the vehicle's systems in accordance with the stored preferences of the individual associated with that key fob.

Although the use of a key fob to identify a driver can sometimes be accurate, in many cases it isn't. A driver may be using someone else's key fob or multiple drivers may share a single key fob. Sometimes, the driver (i.e., the individual carrying the key fob) chooses to ride as a passenger in the vehicle while another individual drives. The car may be borrowed by another driver. Two key fobs may be present in the vehicle at the same time and the vehicle may incorrectly detect and identify a key fob held by a passenger rather than that of the driver. Finally, the key fob may be utilized by an unauthorized user.

In each of those cases, the use of key fob to identify the driver would result in an inaccurate identification. As a result, the vehicle's systems, if automatically configured in accordance with preferences associated with the key fob, would be incorrectly configured for the individual actually driving the vehicle.

SUMMARY

The disclosure relates in general to an integrated biometric user interface and, more particularly, to a user interface incorporating a biometric sensor, such as a fingerprint reader, for identifying a user and controlling one or more vehicle system.

In one implementation, the present invention is a user interface for controlling an electronic system in communication with a vehicle. The user interface includes a fingerprint reader, a push-button switch mounted to the fingerprint reader and configured to detect a user pressing upon a surface of the fingerprint reader, and a controller. The controller is configured to detect the user pressing upon the surface of the fingerprint reader using the push-button switch, and, after detecting the user pressing upon the surface of the fingerprint reader, capture fingerprint data of the user using the fingerprint reader.

In another implementation, the present invention is a user interface for controlling a start-stop function of a vehicle. The user interface includes a fingerprint reader, a push-button switch mounted to the fingerprint reader and configured to detect a user pressing upon a surface of the fingerprint reader, and a controller. The controller is configured to detect the user pressing upon the surface of the fingerprint reader using the push-button switch, and, after detecting the user pressing upon the surface of the fingerprint reader, capture fingerprint data of the user using the fingerprint reader. The interface includes a vehicle processor configured to receive the fingerprint data from the controller, use the fingerprint data to identify a driver of the vehicle, and configure at least one device of the vehicle in accordance with a preference of the user.

In another implementation, the present invention is a method of operating a vehicle system. The method includes detecting a user pressing upon a surface of a user interface for controlling the vehicle system, after detecting the user pressing upon the surface of the user interface, capturing fingerprint data of the user, and using the fingerprint data to identify the user.

DETAILED DESCRIPTION OF THE DRAWINGS

The disclosure relates in general to an integrated biometric user interface and, more particularly, to a vehicle user interface incorporating a biometric sensor, such as a fingerprint reader, for identifying a user and controlling one or more vehicle system.

The present system and method is presented in several varying embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the system. One skilled in the relevant art will recognize, however, that the system and method may both be practiced without one or more of the specific details, or with other methods, components, materials, and so forth. In other instances, well-known structures, materials, or operations are not shown or described in detail to avoid obscuring aspects of the invention.

Figure 2:
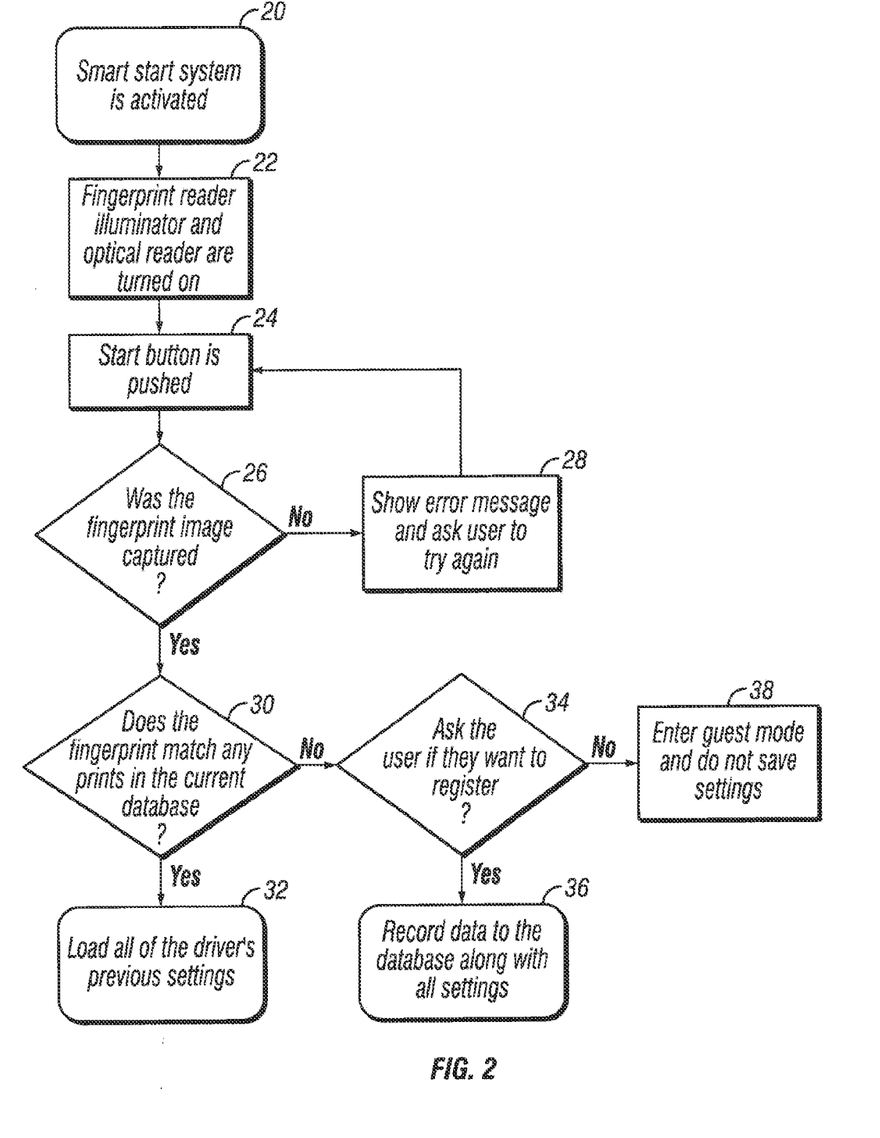
FIG. 2 is a flowchart showing an example method for operating a vehicle incorporating the present biometric switch to control the start-stop function of the vehicle.

The schematic flow chart diagrams included are generally set forth as logical flow-chart diagrams (e.g., FIG. 2). As such, the depicted order and labeled steps are indicative of one embodiment of the presented method. Other steps and methods may be conceived that are equivalent in function, logic, or effect to one or more steps, or portions thereof, of the illustrated method.

Additionally, the format and symbols employed are provided to explain the logical steps of the method and are understood not to limit the scope of the method. Although various arrow types and line types may be employed in the flow-chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present system integrates a biometric reader, such as a fingerprint reader, into a user interface (e.g., a switch or push button) arrangement usable in a vehicle compartment of a vehicle to control one or more systems of the vehicle or systems in communication with the vehicle. In one configuration, the user interface is used to provide a vehicle start-stop function. The integrated biometric reader is configured to captures the user's identity as the user uses the user interface. When incorporated into the vehicle start-stop button, for example, the system allows the actual driver to be accurately identified upon starting the vehicle.

In one implementation, the biometric reader is incorporated into a push-button user interface. When using the push-button, the driver is able to use a familiar user interface for starting the vehicle, but is identified at the same time, allowing the vehicle to setup numerous vehicle systems in accordance with the driver's stored preferences. As the user activates the start-stop control (e.g., by pressing against the push-button switch), the user's finger contacts an integrated biometric reader that reads the user's identity (e.g., by detecting the user's fingerprint) to identify the driver. Also, as the user activates the control, the vehicle can take another appropriate action, such as starting the vehicle's engine. In some cases, the ability to start the vehicle using the start-stop control is predicated upon the presence of a suitable security token (e.g., key fob) within the vehicle. In other cases, though, the authority of a user to start the vehicle can be determined solely by the user's identity—captured via the biometric reader.

Figure 1A:
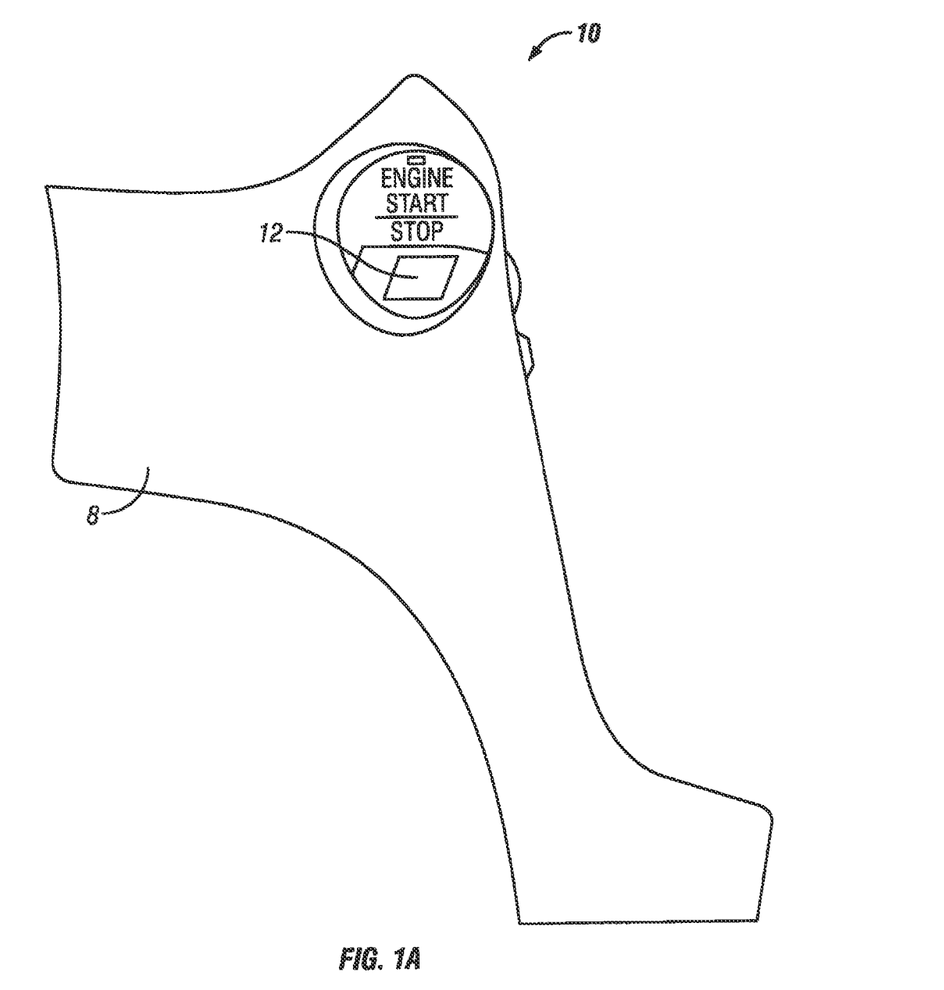
FIG. 1A shows an example installation of the present biometric switch into a portion of a vehicle dashboard.

The present biometric user interface can be mounted within the vehicle's passenger compartment at any convenient location for operation by a driver. FIG. 1A, for example, shows an example installation 10 of the present biometric switch 12 into a vehicle dashboard. As shown in FIG. 1A, switch 12 is mounted within a panel of dashboard 8 of a vehicle. Switch 12 is activated using a push button and includes a surface configured to read a fingerprint of a user pressing upon switch 12. To operate switch 12, the user presses down upon the surface of switch 12. This action both allows switch 12 to read the user's fingerprint as well as operate as a push button switch allowing the vehicle to be started or stopped, or to take any other appropriate action upon actuation of switch 12.

A number of different fingerprint detection technologies may be incorporated into switch 12. Example technologies include a contact-detection system that detects ridges in a user's fingerprint that are in contact with a surface and valleys in the fingerprint that are not in contact with the sensor surface. The switch may also include a multi-spectral imaging application that uses a number of illumination sources each having different angles of incidence upon the platen of the fingerprint sensor in combination with direct imaging to capture data regarding the user's fingerprint. The multiple captured images can then be combined to accurately reconstruct the user's fingerprint.

Modern fingerprint scanning technologies allow for the construction of fingerprint scanners that are ideal for extreme environmental conditions that are often found in automobile implementations. For example, these sensors can be very reliable in environments that vary from very hot to very cold, and dry to humid, and may include rain or snow.

By embedding a fingerprint scanner into switch 12 of a vehicle, every time the vehicle is to be started or stopped (or another function associated with switch 12 is actuated), the user must use switch 12, thereby allowing the vehicle to capture the identity of the vehicle operator. As such, if the switch is used to start the vehicle, upon starting the vehicle the driver can be identified and the vehicle can setup a number of in-vehicle systems in accordance with that person's preferences.

Figure 1B:
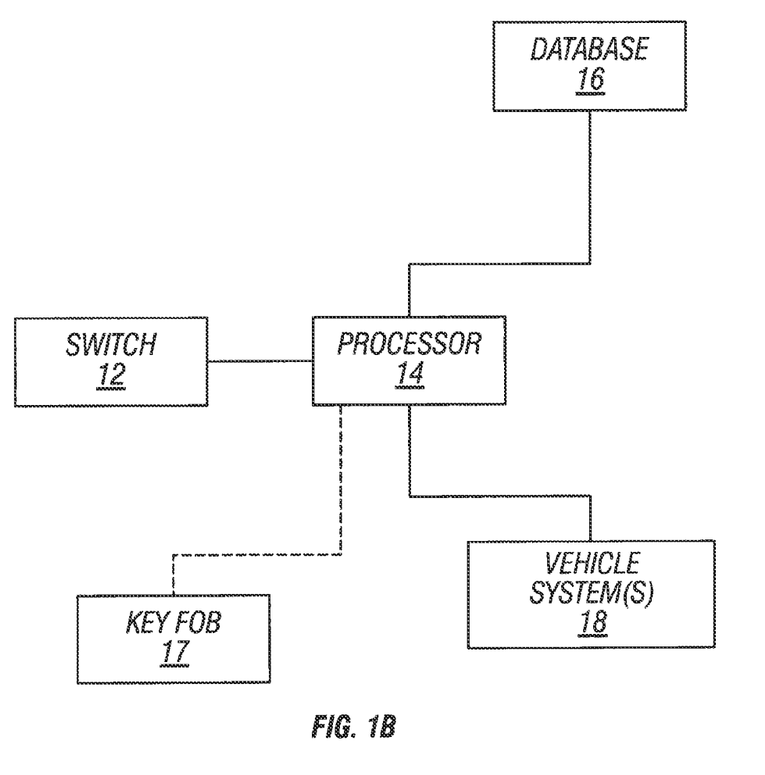
FIG. 1B is a block diagram showing the interconnection between the present integrated biometric switch and a number of vehicle components.

FIG. 1B is a block diagram showing the interconnection between the present integrated biometric switch and a number of vehicle components. In FIG. 1B, a vehicle's control system or processor 14 is in communication with a number of vehicle components. Processor 14 is connected to user interface switch 12 to receive information therefrom. Switch 12 is configured to capture biometric data (e.g., a fingerprint) from a user. Switch 12 also detects when the switch has been activated. Processor 14 is connected to switch 12 and is configured to receive both the biometric data and the switch's status from switch 12. As described below, processor 14 can use the biometric data to identify the driver and configure a number of vehicle systems in accordance with that driver's preferences. Additionally, processor 14 uses the switch status data to control the operation of one or more vehicle systems. For example, the switch status may be used to control whether the vehicle's engine is to be started or stopped.

Processor 14 is in communication with database 16. Database 16 stores preference information describing the preferred configuration for a number of in-vehicle systems for a number of users. The preferences may specify a particular seat adjustment, mirror adjustment, entertainment system configuration, climate control setting, engine or suspension performance settings, and the like. The preferences may also specify particular configurations for non-vehicle systems that are connected to or in communication with the vehicle (e.g., paired cell phones, laptops, music players, and the like). Preference information may be stored for a number of users. Each user is also associated with particular biometric data. For example, a unique fingerprint may be associated with each set of user preferences and, thereby, each user. By associating the biometric data with particular preferences, processor 14 can retrieve a particular user's preferences from database 16 based upon the biometric data received from switch 12.

After the user's preferences are retrieved, processor 14 modifies the configuration of a number of vehicle systems 18 in order to setup those systems in accordance with the user's preferences.

In some implementations, processor 14 may also be configured to communicate wirelessly with a key fob 17. Processor 14, for example, may not allow the vehicle to be started unless a particular key fob 17 is present and detected within the vehicle by processor 14.

FIG. 2 is a flowchart showing an example method for operating a vehicle incorporating the present biometric switch to control the start-stop function of the vehicle. In the method shown in FIG. 2, the biometric switch includes a push-button actuator that includes a fingerprint reader configured to read the fingerprint of a user using the push button. In step 20 the vehicle's smart start system detects the presence of an authorized key fob (either inside the vehicle's passenger compartment or nearby the vehicle). This allows the vehicle to be started by actuation of the biometric start-stop switch. In other implementations, though, any set of triggers may be defined for causing the vehicle's start system to initiate (e.g., the unlocking of the vehicle's door, the opening of a door, and the like).

In step 22, after the smart start system is activated, the fingerprint reader of switch 12 is powered-up to turn on one or more illuminator disposed within the fingerprint reader, allowing the reader to read a user's fingerprint. Additionally, the optical reader component of switch 12 is turned on.

After the switch's fingerprint reader is turned on, the user wishes to start the vehicle. Accordingly, in step 24 the system detects that the user has pressed switch 12 to start the vehicle. Upon detecting that switch 12 was pressed, the system attempts to read a fingerprint of the user.

After attempting to read the user's fingerprint, in step 26 the system determines whether fingerprint data was successfully captured from switch 12. If not, in step 28 the system displays an error message requesting that the user push upon switch 12 to again allow the system to attempt to capture a fingerprint.

If fingerprint data was successfully captured, in step 30 the system compares the captured fingerprint data to fingerprint data for existing drivers stored by the vehicle. If there is a match, the preference settings for the matching driver are retrieved from the database in step 32 and the systems of the vehicle are configured in accordance with that driver's preferences.

Figure 4:
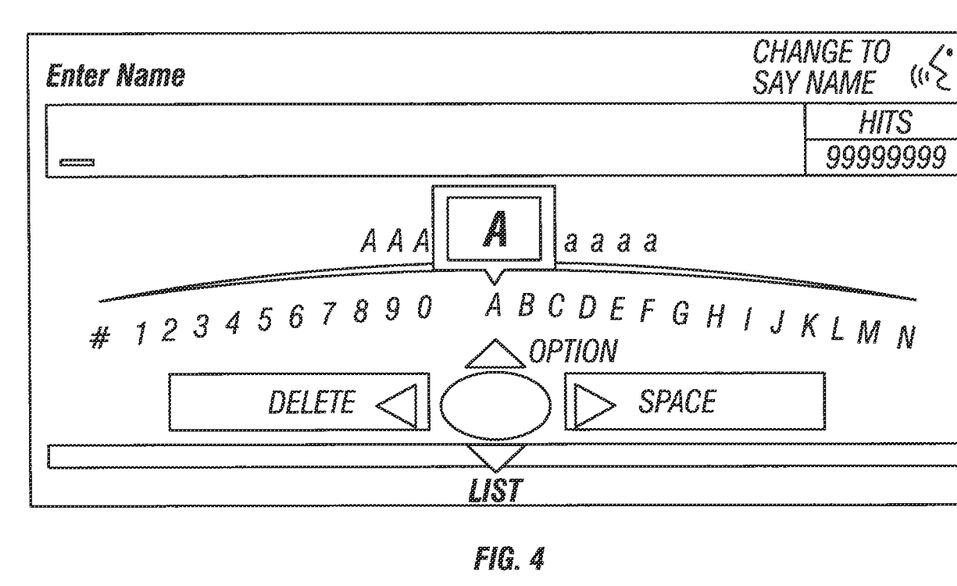
FIG. 4 shows an example user interface screen allowing a user to enter his or her name allowing the user's vehicle preference settings to be stored by the vehicle.

If, however, in step 30 a matching fingerprint was not found in the vehicle's database, that may indicate that the driver is new to the vehicle. In that case, in step 34 the vehicle prompts the driver to see whether he or she wishes to register as a driver of the vehicle. If so, in step 36 the vehicle records the current vehicle settings to a database where the settings are associated with the registered driver's fingerprint. The driver is then prompted with a screen interface allowing the user to enter their identifying information. That identifying information is then associated with the driver's preferences stored in the vehicle database. FIG. 4 shows an example user interface screen allowing a user to enter his or her name thereby allowing the user's vehicle preference settings to be stored by the vehicle. As the driver adjusts one or more of those settings (e.g., by changing a position of the driver's seat or mirrors), those updated settings are stored in the vehicle's database and associated with the now-registered driver.

If the user does not wish to register in step 34, the system enters a guest or valet mode in step 38. In the guest mode, the user is allowed to operate the vehicle, but the current settings of the in-vehicle systems will not be saved. Additionally, the capabilities of the vehicle may be limited (e.g., by providing only limited access to the address book, limited range, limited speed, etc.). In some implementations, though, if the driver is not recognized, operation of the vehicle is disallowed and the vehicle will not start.

In other implementations, the identity of the driver of the vehicle can be used to control the vehicle in other ways. For example, a particular driver may only be authorized to use the vehicle within particular time periods. In that case, if the user attempts to start the vehicle outside of the authorized time period, the vehicle will not start. Similarly, a particular driver may only be authorized to operate the vehicle at particular speeds less than a defined maximum speed. In that case, once the driver is identified, the performance capabilities of the vehicle can be limited so as to not exceed that maximum speed.

Figure 3:
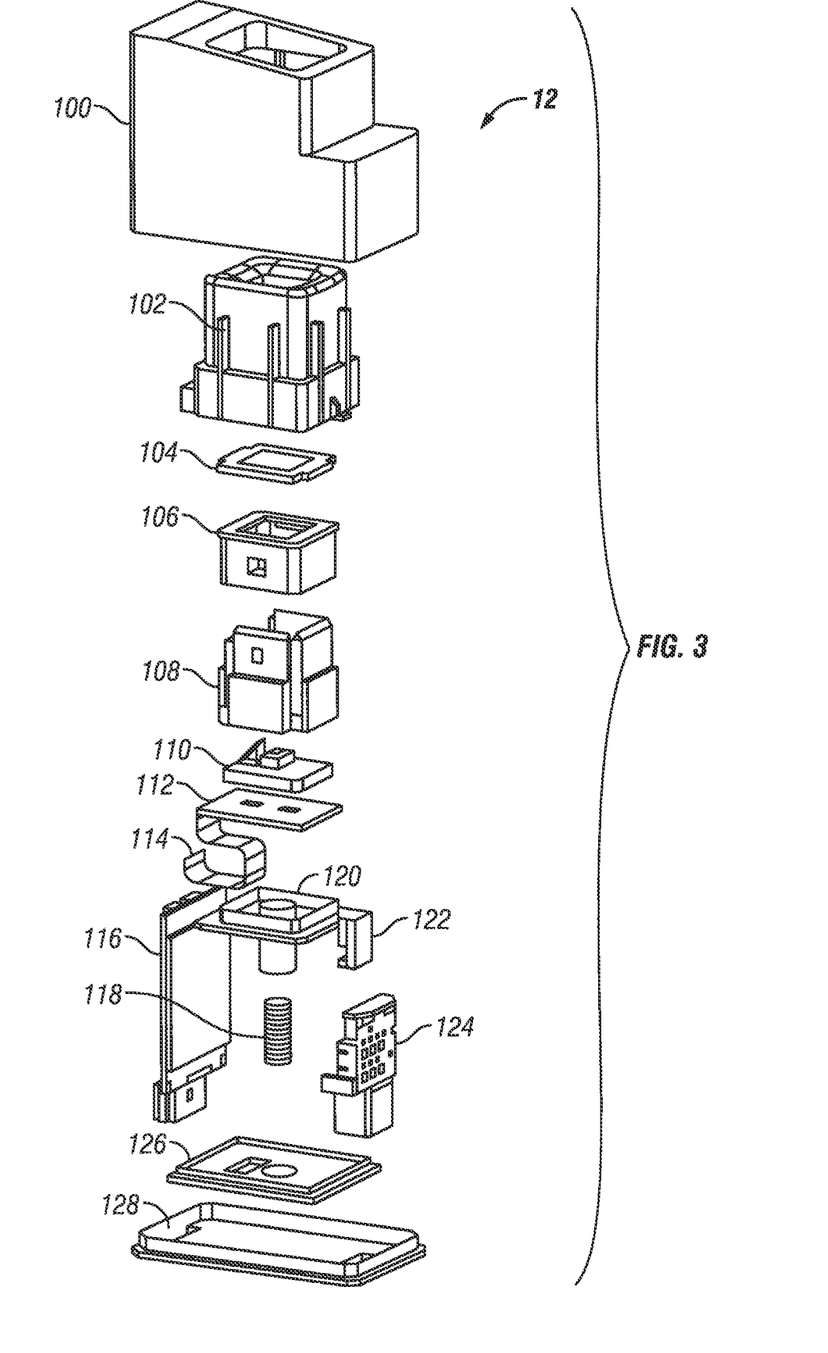
FIG. 3 is an exploded view of a switch incorporating a fingerprint reader in combination with a push button switch.

FIG. 3 is an exploded view of switch 12 incorporating a fingerprint reader in combination with a push button switch. As shown in FIG. 3, switch 12 includes housing 100 for containing the components of switch 12. Housing 100 is generally configured to be integrated into the dashboard of a vehicle in a location allowing actuation of switch 12 by a driver of the vehicle.

Housing 100 is positioned over the components of switch 12 and provides environmental protection to the component disposed therein. Housing 100 fits over carriage 102 of switch 12. Carriage 102 contains the components of the fingerprint reader portion of switch 12. Platen 104 of the fingerprint reader is positioned within carriage 102 of the fingerprint reader. Platen support 106 provides a suitable mount point for platen 104 within carriage 102.

The optical assembly of the fingerprint reader includes chamber 108 that fits over optical assembly 110 of the fingerprint reader. The optical assembly includes the mirrors, chamber, lens assembly, IR filters, and camera of the fingerprint reader. To provide protection to and enclose those components, chamber 108 is mounted over optical assembly 110. A top portion of chamber 108 includes an opening so that the optical components of optical assembly 110 can transmit to, and receive reflections from, platen 104.

Fingerprint reader printed circuit board (PCB) 112 is electrically connected to optical assembly 110. PCB 112 allows for electrical signals to be communicated to and received from optical assembly 110.

A controller PCB 116 is interconnected with PCB 112 using ribbon cable 114. Controller PCB 116 includes one or more processor configured to control the components of optical assembly 110 and also to receive data therefrom. During operation, the processor or processors of PCB 116 instruct the components of optical assembly 110 to illuminate platen 104 with light in order to capture fingerprint data therefrom. PCB 116 is also configured to capture the resulting data and may perform an analysis in order to characterize the fingerprint data (possibly by identifying a user associated with the fingerprint).

PCB 116 may also be in communication with one or more vehicle system. For example, PCB 116 may communicate with the vehicle's smart start system to control whether the fingerprint reader (e.g., the components of optical assembly 110) should be activated—if the smart system indicates that the vehicle is not in condition to start, optical assembly 110 will not be operational.

Additionally PCB 116 is configured to communicate the results of a particular fingerprint scan to a vehicle computer system allowing the vehicle computer system to identify the driver and setup various vehicle systems in accordance with that driver's stored preferences.

To provide the push-button functionality of switch 12, the fingerprint reader (e.g., the components enclosed within carriage 102) is mounted to a push-button switch arrangement. Accordingly, PCB 112 of the finger print reader assembly is mounted to base 120. Base 120 is connected to back cover 128 of switch 12 via spring 118 and retainer 126. Spring 118, in combination with base 120, allows carriage 102 to move up and down within housing 100 providing the push-button movement of switch 12 when a user presses upon platen 104 of the fingerprint reader.

To detect a press of switch 12, switch contact 122 is mounted to switch support 124. Support 124 is then mounted to switch 12 between base 120 and back cover 128. As the user presses upon platen 104 of the fingerprint reader, causing spring 118 to compress, switch contact 122 closes. The closing of switch contact 122 is detected by a processor on PCB 116, which can then transmit a switch activation signal to the vehicle's computer system allowing that system to take appropriate action (e.g., by starting or stopping the vehicle's engine).

Although the present invention has been described with respect to preferred embodiment(s), any person skilled in the art will recognize that changes may be made in form and detail, and equivalents may be substituted for elements of the invention without departing from the spirit and scope of the invention. Therefore, it is intended that the invention not be limited to the particular embodiments disclosed for carrying out this invention, but will include all embodiments falling within the scope of the appended claims.

What is claimed is:

1. A user interface for controlling an electronic system in communication with a vehicle, comprising:
    a housing, including:
        a fingerprint reader disposed within the housing and being configured to move within the housing, and
        a switch contact mounted to the fingerprint reader and configured to close upon sufficient displacement of the fingerprint reader resulting from a user pressing upon a platen of the fingerprint reader; and
    a controller configured to:
        detect an authorized key fob,
        after detecting the authorized key fob, turn on an illuminator and an optical reader of the fingerprint reader,
        after turning on the illuminator and the optical reader, detect that the switch contact is closed, and
        when the authorized key fob is detected and the switch contact is closed:
            at least one of start and stop an engine of the vehicle, and
            capture fingerprint data of the user using the fingerprint reader.

2. The user interface of claim 1, wherein the fingerprint reader includes a multispectral imaging device.

3. The user interface of claim 1, including a vehicle processor configured to:
    receive the fingerprint data of the user;
    access a user preference database to identify a preference using the fingerprint data; and
    configure at least one device of the vehicle in accordance with the preference.

4. The user interface of claim 3, wherein the device of the vehicle includes at least one of an entertainment device, climate control device, and seat positioning device.

5. The user interface of claim 1, wherein the user interface is configured to mount to a dashboard of the vehicle.

6. A user interface for controlling a start-stop function of a vehicle, comprising:
    a housing:
        a fingerprint reader disposed within the housing and being configured to move within the housing, and
        a switch mounted to the fingerprint reader and configured to detect a displacement of the fingerprint reader resulting from a user pressing upon a surface of the fingerprint reader;
    a controller configured to:
        detect an authorized key fob,
        after detecting the authorized key fob, turn on an illuminator and an optical reader of the fingerprint reader,
        after turning on the illuminator and the optical reader, detect the user pressing upon the surface of the fingerprint reader using the switch, and
        when the authorized key fob is detected and the user is detected pressing upon the surface of the fingerprint reader:
            at least one of start and stop an engine of the vehicle, and
            capture fingerprint data of the user using the fingerprint reader; and
    a vehicle processor configured to:
        receive the fingerprint data from the controller,
        use the fingerprint data to identify a driver of the vehicle, and
        configure at least one device of the vehicle in accordance with a preference of the user.

7. The user interface of claim 6, wherein the fingerprint reader includes a multispectral imaging device.

8. The user interface of claim 6, wherein the user interface is configured to mount to a dashboard of the vehicle.

9. The user interface of claim 6, wherein the vehicle processor is configured to, when no preferences are associated with the user, prompt the user to provide identifying information.

10. A method of operating a vehicle system, comprising:
    detecting, by a controller, an authorized key fob;
    after detecting the authorized key fob, turning on an illuminator and an optical reader of a fingerprint reader,
    after turning on the illuminator and the optical reader, detecting, by the controller, a displacement of a platen of the fingerprint reader, the fingerprint reader being disposed within a housing and configured to move within the housing;
    after detecting, by the controller, the authorized key fob and displacement of the platen of the fingerprint reader:
        at least one of starting and stopping an engine of the vehicle, and
        capturing fingerprint data of a user pressing upon the platen; and
    using, by a vehicle processor, the fingerprint data to determine an identity of the user.

11. The method of claim 10, including, after using the fingerprint data to determine the identity of the user, using the identity of the user to retrieve a preference of the user.

12. The method of claim 11, including using the preference to modify a configuration of a device in communication with the vehicle.

13. The method of claim 12, wherein the device of the vehicle includes at least one of an entertainment device, climate control device, and seat positioning device.

14. The method of claim 10, including:
    when there are no preferences associated with the user, prompting the user to enter identifying information.

* * * * *